United States Patent [19]
> Licht et al.

[11] Patent Number: 4,925,988
[45] Date of Patent: May 15, 1990

[54] LOW FOAMING SURFACTANT

[75] Inventors: Brigitte H. Licht, Burlington; Roger T. Bentley, Guelph; Frederick S. Schell, Kitchener, all of Canada

[73] Assignee: Hart Chemical Limited, Guelph, Canada

[21] Appl. No.: 233,028

[22] Filed: Aug. 17, 1988

Related U.S. Application Data

[63] Continuation-in-part of Ser. No. 168,562, Mar. 7, 1988, abandoned, which is a continuation of Ser. No. 890,024, Jul. 28, 1986, abandoned.

[51] Int. Cl.$^5$ ............................................. C07C 43/11
[52] U.S. Cl. ..................................................... 568/625
[58] Field of Search ............................... 568/625, 618

[56] References Cited

U.S. PATENT DOCUMENTS 4,411,810 10/1983 Dutton et al. .

Primary Examiner—Howard T. Mars
Attorney, Agent, or Firm—Sim & McBurney

[57] ABSTRACT

A novel low foaming non-ionic surfactant having good wetting properties has a molecular weight of about 1700 to about 2300 and the formula:

$$R-O-X-Y-H$$

wherein R is a primary alkyl group having about 6 to about 10 carbon atoms, X is a random mixture of EO and PO groups containing about 10 to about 12 EO groups and wherein the mole ratio of EO:PO groups is about 4:1, and Y is a PO block containing about 15 to about 25 PO groups, preferably about 21 to about 25.

3 Claims, 4 Drawing Sheets

LOW FOAMING SURFACTANT

REFERENCE TO RELATED APPLICATION

This application is a continuation-in-part of copending U.S. patent application Serial No. 168,562 filed Mar. 7, 1988, which itself is a continuation of U.S. application Serial No. 890,024 filed July 28, 1986 (now abandoned).

FIELD OF INVENTION

The present invention relates to certain novel low foaming, biodegradable, non-ionic liquid surfactants exhibiting good detergency properties.

BACKGROUND TO THE INVENTION

Non-ionic surfactants are widely used in commercial and household applications where advantage is taken of their superior performance as a wetting agent, their detergency and scouring characteristics, their adaptability for being combined with other types of surfactants and resistance to hard water conditions. Often such surfactants foam too much for certain applications, for example, in automatic dishwashers.

In recent years a number of non-ionic surfactants have been developed and used commercially, which are designated as low-foaming. When the need for foam suppression is of prime importance, the non-ionic surfactants developed to meet this requirement often have been found to sacrifice other desirable characteristics, such as detergency.

It has long been known to prepare non-ionic surfactants by the addition of ethylene oxide or mixtures of ethylene oxide and propylene oxide to various alcohols, generally long chain monohydric alcohols. Numerous different adducts have been described in the patent literature, some of which contain only oxyethylene groups while others contain a random distribution of oxyethylene and oxypropylene groups or discrete blocks of polyoxyethylene and polyoxypropylene. Representative prior art patents describing such adducts include U.S. Pat. Nos. 2,674,619, 2,677,700, 3,101,374, 3,770,701, 3,956,401, 4,410,477 and 4,411,810.

U.S. Pat. No. 3,956,401 describes a low foaming, biodegradable non-ionic surfactant which is liquid at room temperature and non-gelling in water solution. The surfactant has the formula:

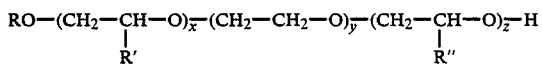

wherein R is a substantially linear alkyl group containing 7 to 10 carbon atoms, R, and R'' are most desirably a methyl group, x is an integer of 1 to 6, y is an integer of 4 to 15 and z is an integer of 4 to 25. This detergent, therefore, comprises successively an oxypropylene (PO) block, an oxyethylene (EO) block and an oxypropylene (PO) block adducted to the alcohol.

U.S. Pat. No. 4,410,447 also describes a liquid low-foaming non-ionic surfactant, which is also said to have good scouring and/or detergency. This surfactant has the formula:

R-O-Ax-B-H wherein R is a primary alkyl group having from 7 to 11 carbon atoms, A is a block of oxypropylene groups, x is an integer from 2 to 15 with the proviso that the total number of carbon atoms in R and A is at least 12, and B is a random mixture of oxyethylene groups and oxypropylene groups wherein the molar ratio of oxyethylene to oxypropylene in A and B is from 0.2:1 to 1.5:1 while the molar ratio of oxyethylene to oxypropylene in B is from 1:1 to 5:1. The compositions have a cloud point from about 20 to about 60° C. This prior art patent, therefore, discloses a detergent which comprises successively a PO block and a random mix of EO-PO adducted to the alcohol.

It is stated in this prior art patent that only by employing alcohols having a particular combination of carbon atoms and various essential amounts of alcohol, propylene oxide and mixtures of ethylene oxide and propylene oxide can products be prepared which are liquid and low foaming and have superior wetting properties.

U.S. Pat. No. 4,411,810 to Dutton et al describes a low foaming non-ionic polyoxyalkylene surfactant for incorporation into dishwashing formulations, so that alkyl phosphate ester defoaming agents can be eliminated from the formulations. The useful polyoxyalkylene surfactants are described as having the formulas:

wherein EO represents ethylene oxide, Y represents the nucleus of an active hydrogen-containing organic compound having a functionality x and (1) about 2 to about 6 aliphatic carbon atoms and 2 to 3 reactive hydrogen atoms or (2) about 6 to about 18 aliphatic carbon atoms and 1 to 3 reactive hydrogen atoms, A represents a lower alkylene oxide including propylene oxide, EO/A represents a mixture of ethylene oxide and a lower alkylene oxide in which EO/A are present in the proportions by weight of 5 to 95 to 5 percent, and m, n and o are integers individually selected such that the polymer has an average total molecular weight of about 500 to about 25,000. This prior art patent, therefore, describes a very wide range of surfactants useful in the dishwashing detergent compositions. Of interest to the present invention are compounds corresponding to formula I, which comprise a random mixture of EO and PO and a PO block adducted to the alcohol. The surfactants are said to require a cloud point in a 1 wt. % aqueous solution of about 15° to about 25° C. in order to be effective.

Although this reference describes the broad classes of widely-varying molecular weight polyoxyalkylene surfactants as low foaming, it will be apparent from the succeeding description of the invention that there are several critical criteria which must be met to provide a combination of low foaming and good detergency.

SUMMARY OF INVENTION

It has now surprisingly been found that it is possible to achieve the desirable combination of properties of liquid, low foaming and superior wetting properties ("detergency") by employing a very specific combination of alkanol, ethylene oxide and propylene oxide which has not heretofore been described. In accordance with the present invention, there is provided a novel liquid, non-ionic surfactant having a molecular weight from about 1700 to about 2300 and which has the formula:

R-O-X-Y-H wherein R is a primary alkyl group having from 6 to 10 carbon atoms, X is a random mixture of oxyethylene and oxypropylene groups containing about 10 to about 12 oxyethylene groups and wherein the molar ratio of oxyethylene to oxypropylene groups is about 4:1, Y is a polyoxypropylene block containing about 15 to about 25 oxypropylene groups.

In contrast, therefore, to the closest known art described above, (i.e. U.S. Pat. Nos. 3,956,401, 4,410,447 and 4,411,810), the present invention provides a liquid, low foaming non-ionic surfactant having good wetting properties by employing the combination adducted to an alkanol containing 6 to 10 carbon atoms of a random mixture of EO and PO groups containing a narrow specific range of EO groups and a narrow specific range of mole ratio of EO:PO groups and a long chain PO block. Based on the descriptions contained in the prior art, it is considered surprising that a desired combination of properties can be obtained by the specific combination employed herein.

The combination which is employed in the surfactant of the invention is very specific and any deviation from the recited parameters leads to a lowering of detergency or increasing foam or both.

The measurement of foaming is often a subjective test without a quantifiable base. The inventors have developed an accurate and sensitive method to measure the formation of foam bubbles and their stability in a scientifically quantifiable manner. In this procedure, an automatic dishwasher is equipped with a pressure sensing device to measure the pump pressure throughout the dishwasher cycles. When foam is generated 9.2 minutes into the cycle (the time at which detergent is dispensed into the washload), the pressure inside the dishwasher drops. The level of pressure drop changes with the amount of foam generated. The fluctuation in pressure indicates the volume and stability of the foam. The amount of foam is measured by calculating the ratio of the area of the pressure profile of a sample to the area of pressure profile of a blank. The calculation is effected using an electronic integrator, which is connected to a pressure sensing device.

The normal or baseline pressure inside a dishwasher is about 12 psi. The pattern of the pressure profile, namely the level of pressure drop, the thickness of the profile and the time taken for the pressure to return to the baseline pressure indicates the characteristics of a surfactant, which, in turn, is a manifestation of their chemical structure. As will be seen below, surfactants with similar chemical formulations display different patterns, if one is a block and the other is a random copolymer.

GENERAL DESCRIPTION OF INVENTION

Figure 1:
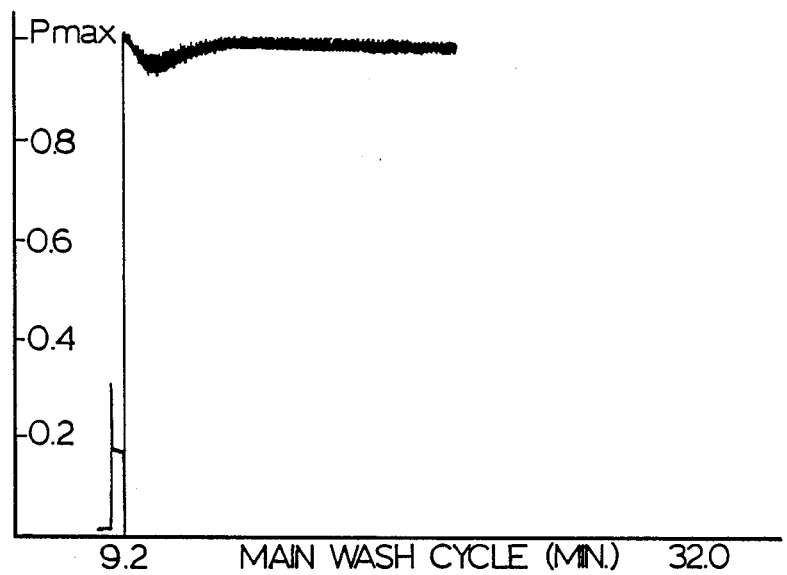
FIGS. 1 to 8 are pressure profiles obtained in dishwasher washing tests carried out in the present invention and detailed in the Examples below.
Figure 2:
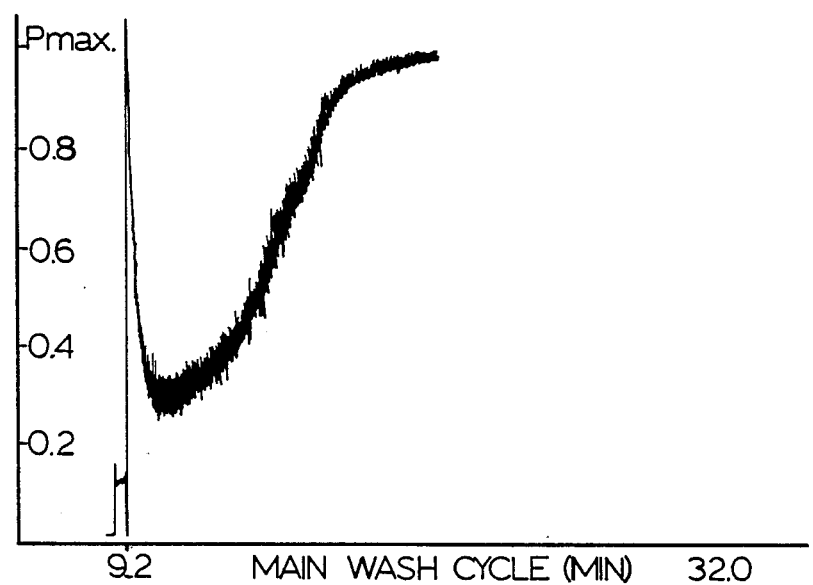
Figure 3:
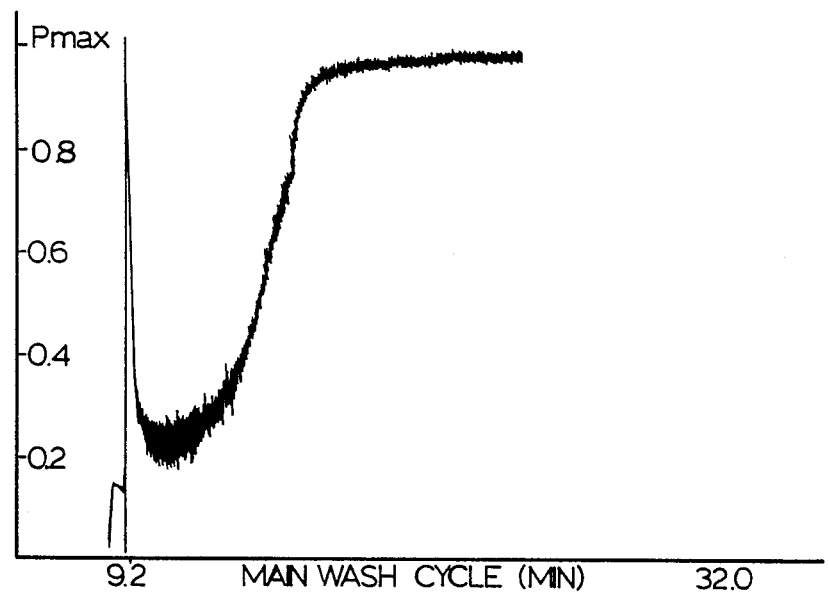
Figure 4:
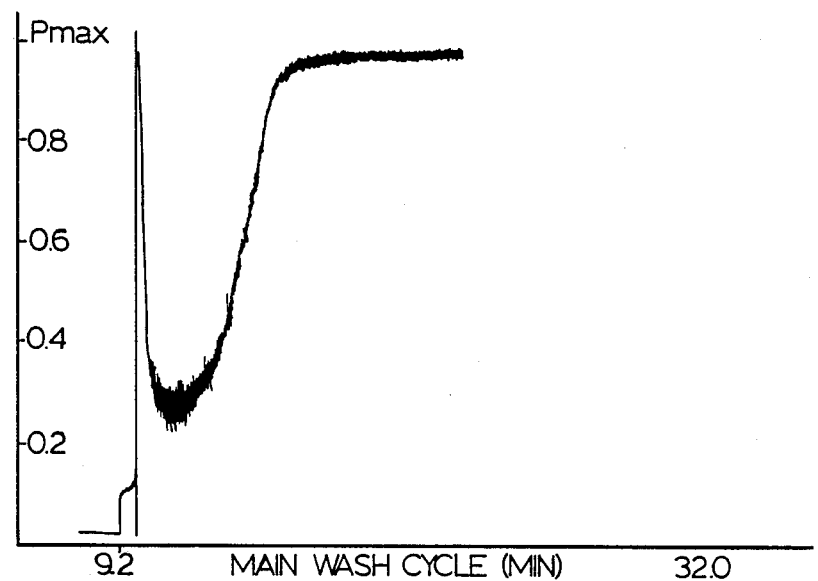
Figure 5:
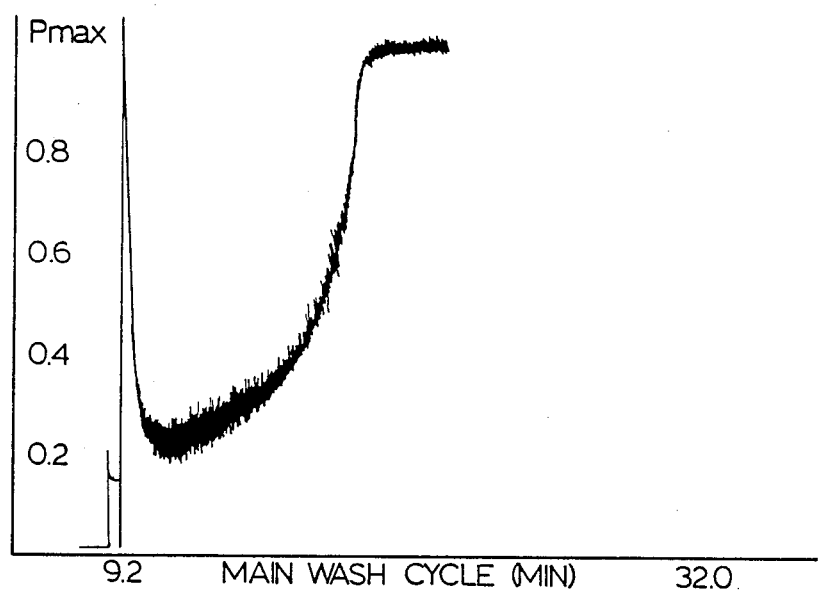
Figure 6:
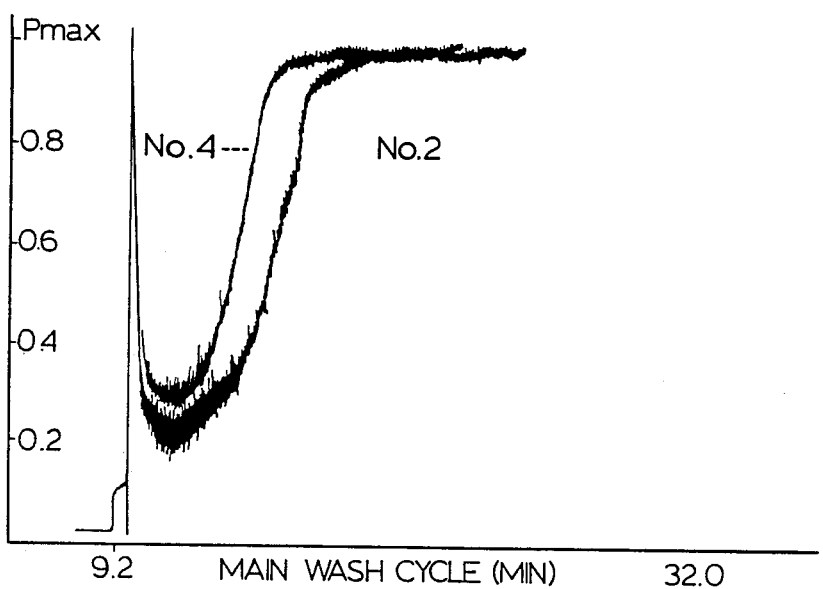
Figure 7:
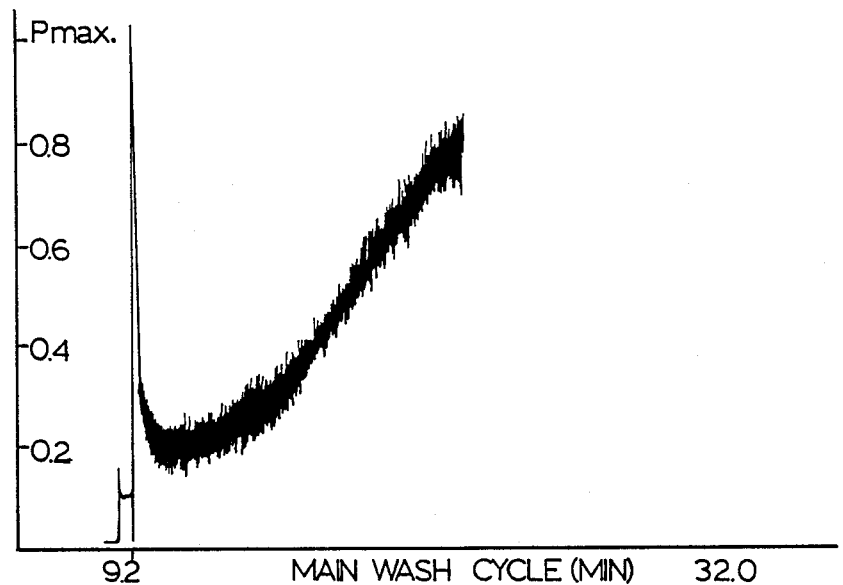
Figure 8:
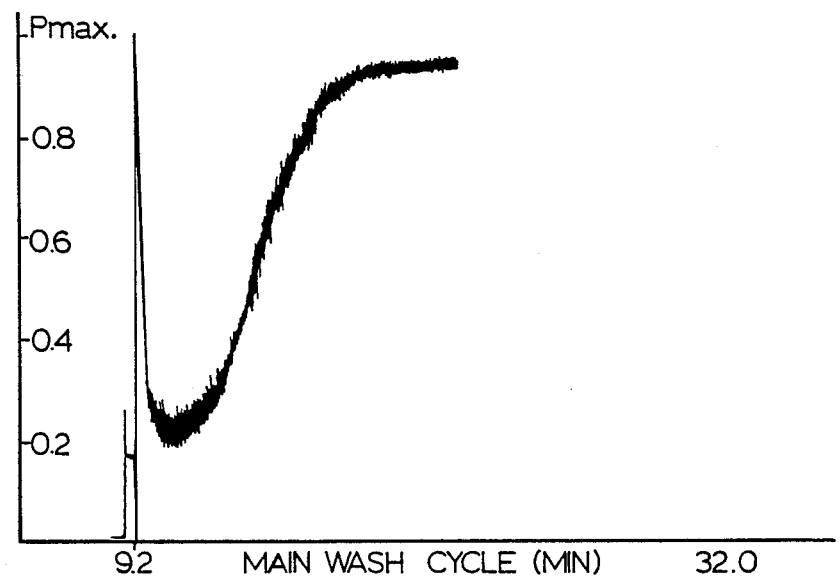

In the surfactant of the invention, the R group is a primary alkyl group having from 6 to 10 carbon atoms. The R group is derived from a linear alkanol, generally from a mixture of alcohols. As a result of the nature of the process by which linear alkanols are prepared, there may be small amounts of branched chain alcohols present and the term "linear alkanol" and "primary alkyl" used herein are intended to include such small amounts of branching. The number of carbon atoms referred to for the R group is an average number since commercial grade alcohols are generally a mixture of more than one alcohol. Preferably, the R group has an average of about 8 to 10 carbon atoms. A variety of linear alkanols is commercially available for use as the source of the R group in the novel surfactants of the invention.

The surfactants of the present invention are prepared by condensing a linear alkanol or more usually a mixture of such linear alkanols with, first, a mixture of ethylene oxide and propylene oxide and, second, propylene oxide, in two distinct steps. In the first step, a mixture of ethylene oxide and propylene oxide is added to the alkanol and, in the second step, propylene oxide alone is added to the reaction product of the first step. In this way, there is produced a non-ionic surfactant which has oxyethylene groups and oxypropylene groups randomly distributed proximate the alkanol portion of the surfactant and a block of oxypropylene groups proximate to random EO-PO chain.

The condensation process effected to produce the products of the invention generally is carried out in the presence of an alkaline catalyst. Catalysts which may be employed include sodium hydroxide, potassium hydroxide, sodium acetate, trimethylamine and an alkali metal alcoholate of the alkanol. The condensation reaction generally is carried out at elevated temperatures and pressures. After completion of the condensation reaction, the catalyst is removed from the reaction mixture by any known procedure, such as neutralization, filtration or ion-exchange.

The products of the present invention, therefore, have a random-block structure. In this random-block structure, it is critical that certain relationships of EO and PO be observed for low foaming and good wetting properties to be attained. In combination with the employment of an R-group which contains 6 to 10 carbon atoms in the alkanol, it is essential to employ, in the random EO-PO chain from 10 to 12 EO groups and an EO:PO mole ratio of about 4:1, and, in the PO block, from 15 to 25 PO groups. If a greater quantity of EO groups than 12 is employed, then, while the detergency of the surfactant increases, the defoaming capability is diminished, because the cloud point increases. If a lesser quantity of EO groups than 10 is employed, then the detergency declines even though the defoaming capability may be enhanced. Similarly, if the molar ratio of EO:PO in the random mix varies significantly from 4:1, either the detergency or defoaming properties of the product are diminished.

The PO block essentially contains from 15 to 25 PO groups, preferably about 20 to 25 PO groups. Products containing less than 15 PO groups do not exhibit good defoaming properties while those containing more than 25 PO groups do not exhibit the required detergency. Generally, longer lengths of PO block chain lead to improvements in the defoaming capability of the surfactant and hence are preferred.

EXAMPLES

A plurality of adducts were prepared as follows. 365 gm of a primary alkanol were charged along with 2.9 gm of potassium hydroxide to a stirred 7.5 liter autoclave. The mixture was purged with nitrogen and heated to 110° C. Vacuum was applied and a mixture of ethylene oxide and propylene oxide in the quantities required to provide the desired random EO-PO block on the alkanol was admitted to the reactor while maintaining a reaction temperature of about 120° to about 130° C. Following a reaction period of about 2 hours, propylene oxide was admitted to the reactor in a quantity corresponding to the desired molar amount of the PO block. Reaction was effected for about 2 hours, following which the mass was cooled and liquid product was discharged.

The alcohol employed was that sold by Vista Chemical Company under the trade mark "ALFOL 610". Specification information provided by the vendor of this product is set forth in the following Table I:

TABLE I

| Property | Specification | Typical |
| --- | --- | --- |
| Total Alcohol, wt. % | 98.5 | 99.4 |
| Homolog distribution wt. % (100% alcohol basis) | | |
| $C_4OH$ and lower | 0.5 max. | 0.2 |
| $C_6OH$ | 4.0 | 4.0 |
| $C_8OH$ | 42.0 ± 4 | 42.5 |
| $C_{10}OH$ | 52.5 ± 4 | 52.8 |
| $>C_{10}OH$ and higher | 1.0 max. | 0.5 |
| Average molecular wt. | | 143 |
| Color, APHA | 10 max. | 0 |
| Appearance | | clear colorless liquid |
| Water, wt. % | 0.15 max. | 0.06 |
| Acidity, as acetic acid, wt. % | 0.005 max. | 0.002 |
| Iodine number | 0.1 max. | 0.02 |
| Acid heat color, APHA | 50 max. | 10 |
| Specific gravity, 60° F. | | 0.830 |
| Flash point, Pensky-Martens, °F. | | 182 |
| Boiling range, °F. | | 350–460 |
| Melting point, °F. | | 1 to 5 |
| Viscosity, 100° F., cSt. | | 6.4 |

The properties of the various products produced are summarized in the following Table II:

TABLE II

| Sample No. | Moles Alcohol | EO/PO Mixture moles EO | EO/PO Mixture moles PO | P.O. Block moles | MWt | Cloud Point °C. |
| --- | --- | --- | --- | --- | --- | --- |
| 1 | 1 | 14.6 | 3.7 | 16.5 | 1958 | 18 |
| 2 | 1 | 10.3 | 2.6 | 15.2 | 1630 | 17 |
| 3 | 1 | 12.1 | 3.0 | 15.2 | 1733 | 17 |
| 4 | 1 | 12.1 | 3.0 | 18.2 | 1905 | 15.5 |
| 5 | 1 | 12.1 | 3.0 | 20.1 | 2017 | 16 |
| 6 | 1 | 12.0 | 3.0 | 22.0 | 2123 | 14 |

All the samples correspond to Formula I from column 2 of Dutton U.S. Pat. No. 4,411,810 mentioned above. However, certain of these samples fall outside the critical range. Thus, sample 1 uses more than 12 EO groups and sample 2 has a molecular weight below the lower limit of 1700.

In addition, two samples were prepared containing the block structure of formula II of column 2 of Dutton U.S. Pat. No. 4,411,810 from the ALFOL 610. These samples were prepared targeted to have a cloud point in the range of 15° to 25° C. as recited in Dutton U.S. Pat. No. 4,411,810. A block polyoxyalkylene on $C_6$ to $C_{10}$ with a cloud point of about 23° C. has the formula:

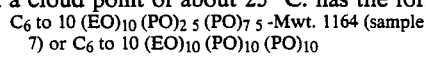
$C_6$ to 10 $(EO)_{10}$ $(PO)_{2.5}$ $(PO)_{7.5}$ -Mwt. 1164 (sample 7) or $C_6$ to 10 $(EO)_{10}$ $(PO)_{10}$ $(PO)_{10}$ A block polyoxyalkylene on $C_6$ to $C_{10}$ with a cloud point of 14° to 15° C. has the following formula:

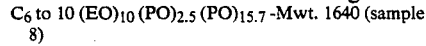
$C_6$ to 10 $(EO)_{10}$ $(PO)_{2.5}$ $(PO)_{15.7}$ -Mwt. 1640 (sample 8)

The sample 8 product is similar to sample No. 3 but one is a block copolymer and the other is random. Both samples have molecular weights outside the range- for the products of this invention.

Each of these products (samples 1 to 8) was tested for effectiveness in a standard automatic dishwasher formulation along with a sample of a competitor's product. The test was carried out in a commercial automatic dishwasher fitted with a pressure sensing device on the exit side of the pump leading to the spray arms. A chart recorder was used to measure the pump pressure throughout the dishwasher cycles. The temperature of the wash water varied during the various cycles between 20° and 55° C. The pressure sensing device was sufficiently accurate to measure the rise and fall in pressure due to the collapse of foam bubbles. The foam was created by 3 ml of a 20% solution of egg yolk.

The charts generated by the chart recorder for some of the test samples are reproduced in FIGS. 1 to 8, as follows:
FIG. 1: Blank (no detergent)
FIG. 2: Sample No. 1
FIG. 3: Sample No. 2
FIG. 4: Sample No. 4
FIG. 5: Competitor's sample
FIG. 6: Comparison of samples 2 and 4
FIG. 7: Sample 7
FIG. 8: Sample 8

Following review of the charts generated by the chart recorder, the following qualitative performance of the samples with respect to defoaming ability was assessed, as set forth in the following Table III:

TABLE III

| Sample No. | Rating |
| --- | --- |
| 1 | Poor |
| 2 | Fair |
| 3 | Good |
| 4 | Good to Excellent |
| 5 | Good to Excellent |
| 6 | Excellent |
| Competitor's Sample | Poor |
| 7 | Poor |
| 8 | Fair |

As may be seen from these results, when the number of ethylene oxide groups exceeds about 12 (Sample 1) or the molecular weight is outside the range of 1700 to 2300 (Samples 2, 7 and 8), the defoaming capability is significantly impaired. With the number of EO groups from 10 to 12 and the mole ratio of EO to PO groups in the random mixture chain about 4:1 and a molecular weight greater than 1700, increasingly better results are obtained with increasing length of PO block (Samples 3 to 6).

When similar products are employed in which the initial EO and PO are present in blocks rather than a random mix, then again defoaming is improved (Samples 7 and 8).

SUMMARY OF DISCLOSURE

In summary of this disclosure, the present invention provides a novel liquid non-ionic surfactant which is low foaming and which has good wetting properties. Modifications are possible within the scope of this invention.

What we claim is:

1. A liquid, low-foaming non-ionic surfactant composition having a molecular weight of about 1700 to about 2300 and having a structure represented by the formula:

R-O-X-Y-H wherein R is a primary alkyl group having from about 6 to about 10 carbon atoms, X is a random mixture of oxyethylene and oxypropylene groups containing about 10 to about 12 oxyethylene groups and wherein the molar ratio of oxyethylene to oxypropylene groups is about 4:1, and Y is a polyoxypropylene block containing about 15 to about 25 oxypropylene groups.

2. The composition of claim 1 wherein group Y is a polyoxypropylene block containing about 21 to about 25 oxypropylene groups.

3. The composition of claim 1 wherein said R group is a mixture of primary alkyl groups containing an average of about 8 to 10 carbon atoms.

* * * * *